United States Patent [19]

Kurihara

[11] Patent Number: 5,660,474
[45] Date of Patent: Aug. 26, 1997

[54] TEMPERATURE DETECTING CIRCUIT GENERATING AN OUTPUT SIGNAL ACCORDING TO THE TEMPERATURE

[75] Inventor: Shinji Kurihara, Gunma, Japan

[73] Assignee: Sanyo Electric Co., Ltd., Osaka, Japan

[21] Appl. No.: 412,065

[22] Filed: Mar. 28, 1995

[30] Foreign Application Priority Data

Mar. 31, 1994 [JP] Japan ............................ 6-063386

[51] Int. Cl.$^6$ ...................................................... G01K 7/00
[52] U.S. Cl. ........................... 374/178; 374/163; 327/513
[58] Field of Search ................................ 374/178, 163; 307/117, 651; 327/512, 513; 257/467

[56] References Cited

U.S. PATENT DOCUMENTS

| | | | |
|---|---|---|---|
| 3,092,998 | 6/1963 | Barton | 374/178 |
| 4,047,435 | 9/1977 | Keith | 374/178 |
| 4,184,126 | 1/1980 | Jaskolski et al. | 374/178 |
| 4,914,317 | 4/1990 | Agiman | 327/513 |
| 4,931,665 | 6/1990 | Yee | 327/513 |
| 5,094,546 | 3/1992 | Tsuji | 374/178 |
| 5,213,416 | 5/1993 | Neely et al. . | |
| 5,488,296 | 1/1996 | Hancock | 327/513 |

FOREIGN PATENT DOCUMENTS

| | | | |
|---|---|---|---|
| 526641 | 2/1993 | European Pat. Off. . | |
| 2357875 | 2/1978 | France . | |
| 127134 | 7/1983 | Japan | 374/178 |
| 61-118630 | 6/1986 | Japan . | |

OTHER PUBLICATIONS

European Search Report, dated Jul. 5, 1995, Appl. No. 95302041.9.

G.C.M. Meijer, et al., "A Three–terminal Integrated Temperature Transducer with Microcomputer Interfacing", Sensors and Actuators, 18 (1989 Jun. 15, No. 2, Lausanne, CH.

Masanori Nishiguche, "Precision Comparison of Surface Temperature measurements Techniques for GaAs IC's", IEEE Transactions on Components, Hybrids, and Manufacturing Technology, 16 (1993) Aug., No. 5, New York, US.

*Primary Examiner*—Scott Cummings
*Attorney, Agent, or Firm*—Loeb & Loeb LLP

[57] ABSTRACT

A temperature detecting circuit generates an output signal depending on temperature and unaffected by variations of power supply voltage. The temperature detecting circuit provides a diode which generates a voltage across two terminals depending on the temperature, a first resistor connected to the anode of this diode, a second resistor whereof one end is earthed, first and second transistors for applying a fixed voltage to the first and second resistors, third and fourth transistors supplied by the current flowing through the first and second resistors, fifth and sixth transistors to the bases of which the emitter currents of the third and fourth transistors are applied, and seventh and eighth transistors to the bases of which the emitter currents of the fifth and sixth transistors are applied. The output current from the output terminal 20 varies according to the temperature, but does not vary with the power supply voltage.

6 Claims, 3 Drawing Sheets

TEMPERATURE DETECTING CIRCUIT GENERATING AN OUTPUT SIGNAL ACCORDING TO THE TEMPERATURE

BACKGROUND OF THE INVENTION

1. Field of the Invention

This invention relates to a temperature detecting circuit that generates an output signal according to a temperature, and more particularly, to a temperature detecting circuit that controls the intensity of a writing laser beam according to the environmental temperature in an MD (Mini Disk) system.

2. Related Art

Conventionally, in a Mini Disk system, a magnetic head is provided to generate a magnetic field in a predetermined part of an MD, and an optical pick-up is provided that emits a laser beam toward this predetermined part of the MD. During recording, the laser beam irradiates the opto-magnetic disk as it rotates, causing the temperature of the irradiated part to rise, and when the temperature reaches the Curie temperature, the coercive force of that part disappears. A magnetic field corresponding to data to be recorded is then applied to the opto-magnetic disk by a magnetic head so that the disk becomes magnetized according to the field. Subsequently, the aforesaid part of the disk is no longer irradiated by the laser beam, and the temperature of that part falls so that the magnetism remains. By repeating this process, data is recorded on the opto-magnetic disk.

In this type of system, a circuit shown in FIG. 3 for detecting environmental temperature is used in generating an intense laser beam that is stable to changes of environmental temperature. In FIG. 3, if the current flowing through a diode 1 is effectively constant with respect to temperature, the temperature characteristic of the forward voltage of the diode 1 is given by:

[1]
$$\frac{dV_D}{dT} = \frac{1}{T}\left\{ -V_{Eg} + V_D - (4-a)\frac{kT}{q} \right\}$$
$$\approx \frac{1}{T}(-V_{Eg}+V_D) \quad (\because V_D \gg (4-a)\frac{kT}{q})$$

where:

$V_D$ is the voltage across the two terminals of the diode,
T is the absolute temperature [K]
$V_{Eg}$ is the energy gap voltage of a semiconductor,
a is a constant related to the temperature characteristic of the degree of mobility
q is an electrostatic charge, and
k is the Boltzmann constant,
From the above:

[2]
$$V_D = V_{Eg} + \frac{dV_D}{dT} \cdot T \qquad ①$$

The current $I_1$ flowing through a resistor 2 is therefore given by:

[3]
$$I_1 = \frac{V_{cc} - V_D - V_{cc}/2}{R}$$
$$= \frac{V_{cc}/2 - V_D}{R} \qquad ②$$

where $R_1$ is the value of the resistor 2. On the other hand, the current $I_2$ flowing through a resistor 3 is given by: [4]

$$I_2 = V_{cc}/2 \cdot R_2 \qquad ③$$

where $R_2$ is the value of the resistor 3.

From (1), (2) and (3), the current $I_3$ flowing through a resistor 4 is therefore given by:

[5]
$$I_3 = I_1 - I_2$$
$$= \left(\frac{1}{2} \cdot V_{cc} - V_D\right)/R_1 - V_{cc}/2 \cdot R_2$$
$$= \frac{1}{2}\left(\frac{1}{R_1} - \frac{1}{R_2}\right)V_{cc} - \frac{V_D}{R_1}$$
$$= \frac{1}{2}\left(\frac{1}{R_1} - \frac{1}{R_2}\right)V_{cc} - \frac{V_{Eg}}{R_1} - \frac{dV_D}{dT} \cdot \frac{T}{R_1}$$

The control voltage $V_C$ of a VCA(voltage controlled amplifier) 5 is therefore obtained from the voltage decrease of the resistor 4, and

[6]
$$V_c = \frac{V_{cc}}{2} - I_3 \cdot R_3 \qquad ④$$
$$= \frac{V_{cc}}{2} \cdot \left(1 - \frac{R_3}{R_2} + \frac{R_3}{R_1}\right) +$$
$$\frac{V_{Eg} \cdot R_3}{R_1} + \frac{dV_D}{dT} \cdot \frac{T \cdot R_3}{R_1}$$

When the environmental temperature of the MD system increases, therefore, the control voltage $V_C$ decreases and the gain of the VCA 5 falls, so the intensity of the laser beam irradiating the MD becomes weaker. Conversely, when the environmental temperature decreases, the control voltage $V_C$ increases, so the intensity of the laser beam becomes stronger.

However in the circuit of FIG. 3, as is clear from Equation (4), the output signal of the amplifier 6 which is the output signal of the temperature detecting circuit varies according to the temperature T and power supply voltage $V_{CC}$. If such a temperature detecting circuit is used to control the intensity of the laser beam in an MD system, therefore, the control voltage $V_C$ varies with the power supply voltage $V_{CC}$ in addition to the environmental temperature T, so accurate recording on the MD cannot be performed.

SUMMARY OF THE INVENTION

This invention was conceived to overcome the aforesaid problems, and aims to provide a temperature detecting circuit that generates an output signal according to the temperature regardless of any change in the power supply voltage.

In order to achieve the above objective, this invention provides a diode whereof the cathode is earthed, a first resistor whereof one end is connected to the anode of this diode, a second resistor whereof one end is earthed, first and second transistors whereof the emitters are respectively connected to the other ends of the first and second resistors, a bias voltage being applied to the bases, and an output signal generating circuit that uses the collector currents of the first and second transistors as an input signal, and generates an output signal according to the input signal.

The output signal generating circuit mentioned hereinabove comprises third and fourth transistors whereof the collectors and bases are connected to a power supply, and the emitters are respectively connected to the collectors of the first and second transistors, a fifth transistor whereof the base is connected to the collector of said first transistor, a sixth transistor whereof the collector is connected to the collector of the fifth transistor and the base is connected to the collector of the second transistor, a first fixed current source connected to the emitter of the fifth transistor, a seventh transistor whereof the base is connected to the emitter of the fifth transistor and the collector is connected to the emitter of the sixth transistor, an eighth transistor whereof the base is connected to the emitter of the sixth transistor, the emitter is connected to the emitter of the seventh transistor and outputs a signal from the collector, and a second fixed current source connected to the common emitter of the seventh and eighth transistors.

The above circuit may be used in a MD system.

According to the above invention, a voltage obtained by subtracting a base-emitter voltage from the bias voltage is generated at the emitters of the first and second transistors, so a predetermined voltage is applied to the diode, first resistor and second resistor which are connected in series. A current therefore flows in the first and second resistors, and as this current flows through the third and fourth transistors, a predetermined voltage is generated at the emitters of the third and fourth transistors, and applied to the bases of the fifth and sixth transistors. A voltage which is lower than the base voltage by a predetermined voltage, is generated at the emitters of the fifth and sixth transistors, and applied to the bases of the seventh and eighth transistors. Further, a voltage lower than the base voltage by a predetermined voltage, is generated at the emitters of the seventh and eighth transistors, and these voltages are the same. An output signal is therefore generated according to variation of temperature regardless of variations in the power supply voltage.

EMBODIMENTS

Figure 1:
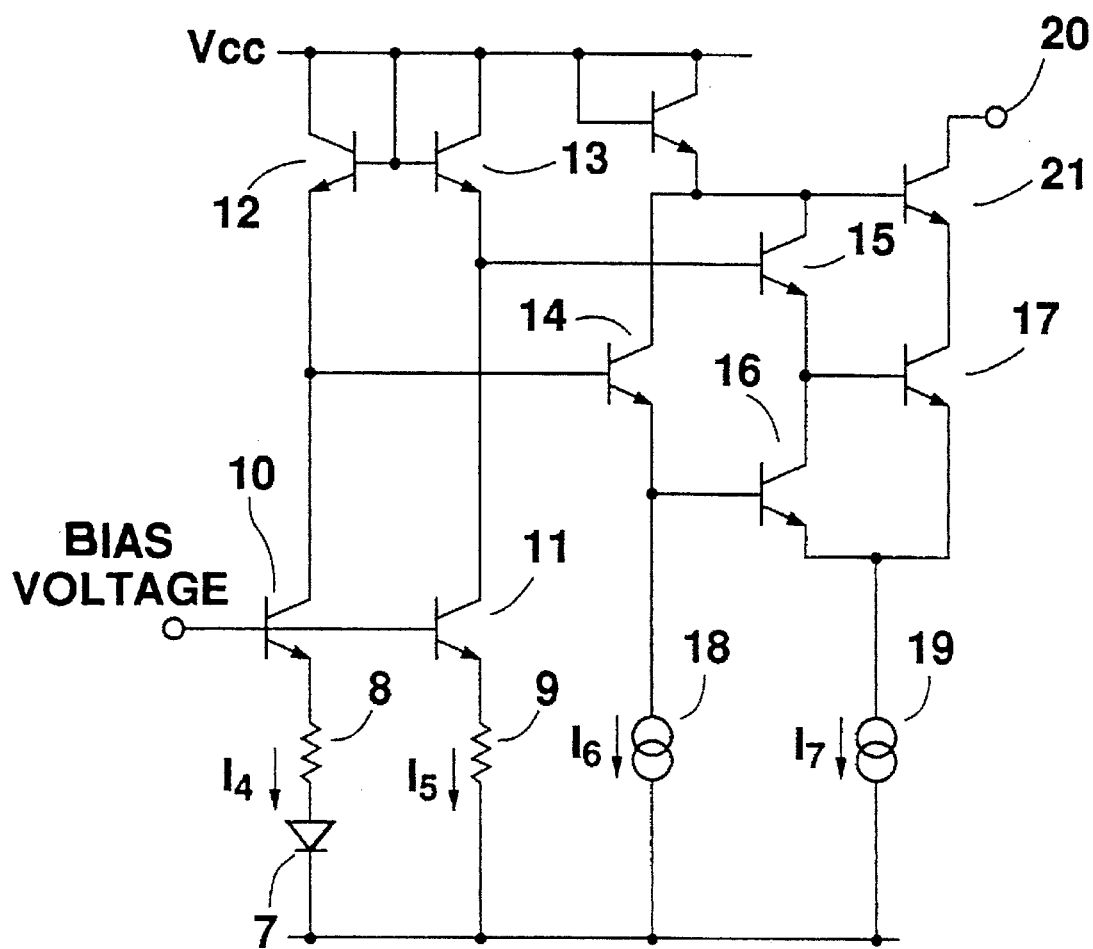
FIG. 1 is circuit diagram showing one embodiment of this invention.

FIG. 1 is a drawing showing one embodiment of this invention. The temperature detecting circuit according to this embodiment comprises a diode 7 whereof the cathode is earthed, a first resistor 8 whereof one end is connected to the anode of the diode 7, a second resistor 9 whereof one end is earthed, first and second transistors 10, 11 for applying a fixed voltage respectively to the other ends of the first and second resistors 8, 9, third and fourth transistors 12, 13 whereof the collectors and bases are connected to a power supply, and the emitters are respectively connected to the collectors of the first and second transistors 10, 11, fifth and sixth transistors 14, 15 whereof the bases are respectively connected to the collectors of the first and second transistors 10, 11, a seventh transistor 16 whereof the base is connected to the emitter of the fifth transistor 14, an eighth transistor 17 whereof the base is connected to the connection point between the emitter of the sixth transistor 15 and the collector of the seventh transistor 16, a first fixed current source 18 connected to the emitter of the fifth transistor 14, and a second fixed current source 19 connected to the common emitter of the seventh and eighth transistors 16, 17. Diode 7 generates, across its two terminals, a voltage dependent on temperature.

In FIG. 1, when a bias voltage is applied to the bases of the first and second transistors 10, 11, a voltage $V_1$ is generated at the emitters of the first and second transistors 10, 11 that is lower than the bias voltage by a voltage $V_{BE}$ (base-emitter voltage) of the transistors. This voltage $V_1$ is set equal to the energy gap voltage $V_{Eg}$ of the diode 7. As the voltage $V_1$ is applied to the first resistor 8, diode 7 and second resistor 9, a current 14 flowing through the first resistor 8 is given by the relation: [7]

$$I_4 = (V_1 - V_D)/R_4 \qquad (5)$$

where the value of the first resistor 8 is $R_4$, and the voltage across the two terminals of the diode 7 is $V_D$. Further, a current $I_5$ flowing through the second resistor 9 is given by the relation: [8]

$$I_5 = V_1/R_5 \qquad (6)$$

where the value of the second resistor 9 is $R_5$.

The base currents of the first and second transistors 10, 11 are small, and if they are ignored, the currents $I_4$, $I_5$ flowing through the first and second resistors 8, 9 are equal to the collector currents of the first and second transistors 10, 11. The collector currents of the first and second transistors 10, 11 are supplied by the third and fourth transistors 12, 13. The base-emitter voltage $V_{BE3}$ of the third transistor 12 is therefore given by:

[9]
$$V_{BE3} = \frac{kT}{q} \cdot \ln\frac{I_4}{I_{S3}}$$

where $I_{S3}$ is the saturation current of the third transistor 12. Likewise, the base-emitter voltage $V_{BE4}$ of the third transistor is given by:

[10]
$$V_{BE4} = \frac{kT}{q} \cdot \ln\frac{I_5}{I_{S4}}$$

where $I_{S4}$ is the saturation current of the fourth transistor 13. The emitter voltages of the third and fourth transistors 13, 14 are therefore respectively $V_{CC}-V_{BE3}$ and $V_{CC}-V_{BE4}$, and are applied to the bases of the fifth and sixth transistors 14, 15. $V_{CC}$ is the power supply voltage.

Also, as the emitter current of the fifth transistor 14 is equal to the current $I_6$ of the first fixed current source 18, the base-emitter voltage $V_{BE5}$ of the fifth transistor 14 is given by:

[11]
$$V_{BE5} = \frac{kT}{q} \cdot \ln\frac{I_6}{I_{S5}}$$

where $I_{S5}$ is the saturation current of the fifth transistor 14, and the emitter voltage of the fifth transistor 14 is $V_{CC}-V_{BE3}-V_{BE5}$.

If the output current produced by the output terminal 20 is $I_{OUT}$, the output current $I_{OUT}$ flows through the eighth and ninth transistors 17, 21. Hence, if the current from the second fixed current source 19 is $I_7$, a current $I_7-I_{OUT}$ flows through the sixth and seventh transistors 15, 16. The base currents of the transistors are negligible, and are therefore neglected.

A current $I_7$-$I_{OUT}$ flows through the sixth transistor 15, so the base-emitter voltage $V_{BE6}$ of the sixth transistor 15 is given by:

[12]
$$V_{BE6} = \frac{kT}{q} \cdot \ln \frac{I_7 - I_{OUT}}{I_{S6}}$$

where $I_{S6}$ is the saturation current through the sixth transistor 15. As the voltage $V_{CC}$-$V_{BE4}$ is applied to the base of the sixth transistor 15, the emitter voltage of the sixth transistor 15 is $V_{CC}$-$V_{BE4}$-$V_{BE6}$, and this voltage is applied to the base of the eighth transistor 17. The current $I_{OUT}$ flows through the eighth transistor 17, hence the base-emitter voltage $V_{BE8}$ of the eighth transistor 17 is given by:

[13]
$$V_{BE8} = \frac{kT}{q} \cdot \ln \frac{I_{OUT}}{I_{S8}}$$

where the saturation current of the eighth transistor 17 is $I_{S8}$, and the emitter voltage of the eighth transistor 17 is $V_{CC}$-$V_{BE4}$-$V_{BE6}$-$V_{BE8}$.

As the current $I_7$-$I_{OUT}$ flows through the seventh transistor 16, the base-emitter voltage $V_{BE7}$ of the seventh transistor 16 is given by:

[14]
$$V_{BE14} = \frac{kT}{q} \cdot \ln \frac{I_7 - I_{OUT}}{I_{S7}}$$

where the saturation current of the seventh transistor 16 is $I_{S7}$. Also, the emitter voltage of the fifth transistor 14 is applied to the base of the seventh transistor 16, so the emitter voltage of the seventh transistor 16 is $V_{CC}$-$V_{BE3}$-$V_{BE5}$-$V_{BE7}$.

Therefore, as the emitters of the seventh and eighth transistors 16, 17 are connected together,

[15]
$$V_{cc} - V_{BE3} - V_{BE5} - V_{BE7} = V_{cc} - V_{BE4} - V_{BE6} - V_{BE8} \quad (7)$$

$$\frac{kT}{q} \cdot \ln \frac{I_4}{I_{S3}} + \frac{kT}{q} \cdot \ln \frac{I_6}{I_{S5}} + \frac{kT}{q} \cdot \ln \frac{I_7 - I_{OUT}}{I_{S7}} =$$

$$\frac{kT}{q} \cdot \ln \frac{I_5}{I_{S4}} + \frac{kT}{q} \cdot \ln \frac{I_7 - I_{Out}}{I_{S6}} + \frac{kT}{q} \cdot \ln \frac{I_{OUT}}{I_{S8}}$$

$$\frac{kT}{q} \cdot \ln \frac{I_4 \cdot I_6 \cdot (I_7 - I_{OUT})}{I_{S3} \cdot I_{S5} \cdot I_{S7}} =$$

$$\frac{kT}{q} \cdot \ln \frac{I_5 \cdot (I_7 - I_{OUT}) \cdot I_{OUT}}{I_{S4} \cdot I_{S6} \cdot I_{S8}}$$

$$\frac{I_4 \cdot I_6}{I_{S3} \cdot I_{S5} \cdot I_{S7}} = \frac{I_5 \cdot I_{OUT}}{I_{S4} \cdot I_{S6} \cdot I_{S8}}$$

$$I_{OUT} = \frac{I_{S4} \cdot I_{S6} \cdot I_{S8}}{I_{S3} \cdot I_{S5} \cdot I_{S7}} \cdot \frac{I_4}{I_5} \cdot I_6$$

Substituting Equations (5) and (6) in Equation (7):

[16]
$$I_{OUT} = \frac{I_{S4} \cdot I_{S6} \cdot I_{S8}}{I_{S3} \cdot I_{S5} \cdot I_{S7}} \cdot \frac{R_5}{R_4} \cdot \frac{V_{Eg} - V_D}{V_{Eg}} \cdot I_6 \quad (8)$$

Also, substituting Equation (1) in Equation (8):

[17]
$$I_{OUT} = \frac{I_{S4} \cdot I_{S6} \cdot I_{S8}}{I_{S3} \cdot I_{S5} \cdot I_{S7}} \cdot \frac{R_5}{R_4} \cdot \frac{-\frac{dV_D}{dT}}{V_{Eg}} \cdot T \cdot I_6 \quad (9)$$

From Equation (9), the output current $I_{OUT}$ is directly proportional to temperature T, hence an output current depending on the temperature is output by the output terminal 20. Moreover, as Equation (9) does not contain a term for the power supply voltage $V_{CC}$, the output current $I_{OUT}$ does not vary with the power supply voltage $V_{CC}$.

Figure 2:
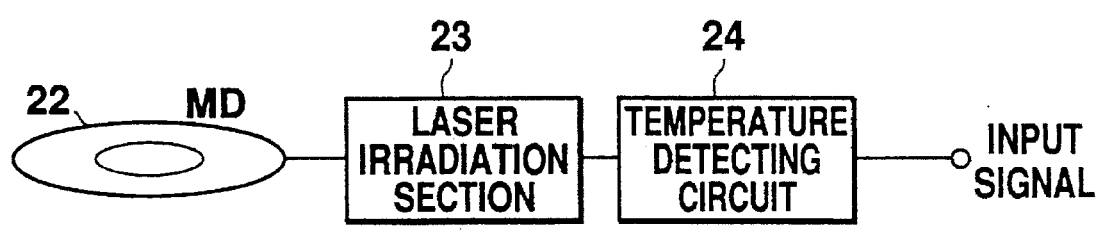
FIG. 2 is a block diagram showing an MD system using a temperature detecting circuit of this invention.
Figure 3:
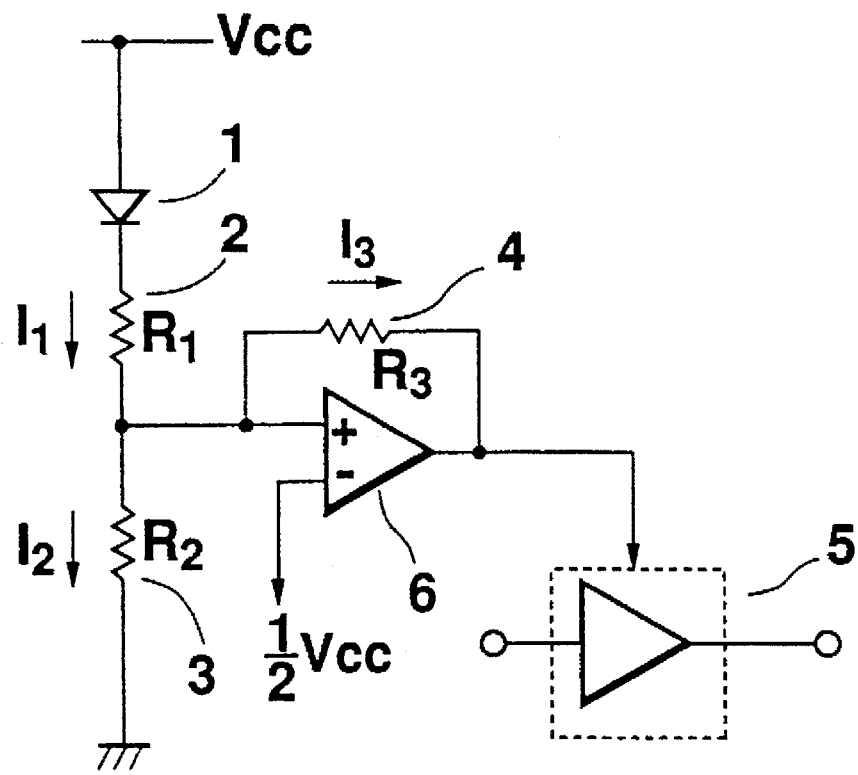
FIG. 3 is a circuit diagram showing a conventional example.

FIG. 2 shows an MD system using the temperature detecting circuit of FIG. 1. The output current of the temperature detecting circuit 24 may for example be converted to a voltage that is used as a control signal, and the signal applied to a control amplifier that controls the intensity of a laser irradiating the MD 22 from a laser irradiation section 23. As the temperature of the laser spot is then effectively constant, accurate recording can be performed, and it is not affected by variations of power supply voltage. Therefore, the temperature of the laser spot is effectively constant even if there is a drop in power, and accurate recording is performed.

According to this invention, an output current is generated from a current obtained by applying a fixed voltage to a diode, first resistor and second resistor connected in series, and a temperature detecting circuit unaffected by power supply voltage can therefore be provided.

What is claimed:

1. A temperature detecting circuit comprising:
   a diode whereof the cathode is earthed, said diode having two terminals between which is produced a voltage which is dependent on temperature,
   a first resistor whereof one end is connected to the anode of said diode,
   a second resistor whereof one end is earthed,
   first and second transistors whereof the emitters are respectively connected to the other ends of said first and second resistors, a bias voltage being applied to the bases, said first transistor having a collector current which is dependent on temperature and said second transistor having a constant collector current, and
   an output signal generating circuit that uses the collector currents of said first and second transistors as an input signal, and generates an output signal according to said input signal.

2. temperature detecting circuit comprising:
   a diode whereof the cathode is earthed,
   a first resistor whereof one end is connected to the anode of said diode,
   a second resistor whereof one end is earthed,
   first and second transistors whereof the emitters are respectively connected to the other ends of said first and second resistors, and
   an output signal generating circuit that uses the collector currents of said first and second transistors as an input signal, and generates an output signal according to said input signal, wherein said output signal generating circuit comprises:
   third and fourth transistors whereof the collectors and bases are connected to a power supply, and the emitters are respectively connected to the collectors of said first and second transistors,
   a fifth transistor whereof the base is connected to the collector of said first transistor, a sixth transistor whereof the collector is connected to the collector of said fifth transistor, and the base is connected to the collector of said second transistor, a first fixed current source connected to the emitter of said fifth transistor, a seventh transistor whereof the base is connected to the emitter of said fifth transistor, and the collector is connected to the emitter of said sixth transistor, an eighth transistor whereof the base is connected to the emitter of said sixth transistor, the emitter is connected to the emitter of said seventh transistor, and outputs a signal from the collector, and a second fixed current source connected to the common emitter of said seventh and eighth transistors.

3. A temperature detecting circuit as defined in claim 2 comprising a ninth transistor whereof the base is connected to the collector of said sixth transistor and the collector of said seventh transistor, and the emitter is connected to the collector of said eighth transistor.

4. A temperature detecting circuit as defined in claim 1, said circuit being used in an MD system.

5. A temperature detecting circuit as defined in claim 2, said circuit being used in an MD system.

6. A temperature detecting circuit as defined in claim 3, said circuit being used in an MD system.

* * * * *